United States Patent [19]

Wefer

[11] Patent Number: 4,493,921

[45] Date of Patent: Jan. 15, 1985

[54] IMPACT RESISTANT BLEND

[75] Inventor: John M. Wefer, Newtown, Conn.

[73] Assignee: Uniroyal, Inc., Middlebury, Conn.

[21] Appl. No.: 584,298

[22] Filed: Mar. 2, 1984

Related U.S. Application Data

[63] Continuation of Ser. No. 423,397, Sep. 24, 1982, abandoned.

[51] Int. Cl.$^3$ .................. C08L 67/02; C08L 69/00
[52] U.S. Cl. ........................................ 525/67; 525/64
[58] Field of Search .............. 525/67, 146, 148, 64, 525/166

[56] References Cited

U.S. PATENT DOCUMENTS

| | | | |
|---|---|---|---|
| 3,864,428 | 2/1975 | Nakamura | 525/67 |
| 4,044,073 | 8/1977 | Baron | 525/177 |
| 4,134,927 | 1/1979 | Tomoshige | 525/285 |
| 4,172,859 | 10/1979 | Epstein | 525/109 |
| 4,202,948 | 5/1980 | Peascoe | 525/70 |
| 4,205,141 | 5/1980 | Liebig | 525/67 |
| 4,257,937 | 3/1981 | Cohen | 525/67 |
| 4,260,690 | 4/1981 | Binsack | 525/64 |
| 4,264,487 | 4/1981 | Fromuth | 525/67 |
| 4,280,949 | 7/1981 | Dieck | 525/67 |
| 4,317,764 | 3/1982 | Sheer | 524/449 |

*Primary Examiner*—John C. Bleutge
*Assistant Examiner*—Patricia Short
*Attorney, Agent, or Firm*—John A. Shedden; James J. Long

[57] ABSTRACT

High impact strength blends based on thermoplastic polyester resin, aromatic polycarbonate resin and graft copolymers of EPDM or EPM.

9 Claims, No Drawings

IMPACT RESISTANT BLEND

This is a continuation of application Ser. No. 423,397, filed Sept. 24, 1982, now abandoned.

This invention relates to a resin blend having high impact strength.

Various blends based on polyester resin, polycarbonate resin, or graft copolymer rubber-resin materials have heretofore been proposed (e.g., U.S. Pat. Nos. 3,591,659; 3,919,353; 4,022,748; 4,034,013; 4,034,016; 4,044,073; 4,096,202; 4,257,937; 4,260,690 and 4,280,949).

The present invention is based on a blend of (a) polyester resin, (b) polycarbonate resin and (c) graft copolymer composition comprising EPDM type rubber grafted with at least one polar monomer. The blend of the invention has unexpected properties, particularly high impact strength in combination with heat resistance.

The polyester resin component (a) of the blend of the invention is ordinarily poly(1,4-butylene terephthalate) and is described for example in U.S. Pat. Nos. 2,465,319; 3,047,539; 4,257,937 and 4,280,949.

The polycarbonate resin component (b) of the blend of the invention is ordinarily an aromatic polycarbonate resin and is described for example in U.S. Pat. Nos. 4,034,016; 4,257,937 and 4,280,949.

The graft copolymer material (c) constituting the third component of the invention is ordinarily based on a graft copolymer of resin-forming monomeric material on a rubbery unsaturated spine polymer of the ethylene-propylene-non-conjugated diene type (EPDM), although saturated rubber spine of the ethylene-propylene copolymer type (EPM) may also be used. The grafted monomeric material is ordinarily at least one polar monomer such as an alkenoic nitrile, ester, amide or acid, or a vinyl aromatic monomer such as styrene; mixtures of such alkenoic monomer and vinyl aromatic monomer are particularly useful in preparing the graft copolymer. Useful monomers include such acids as acrylic and methacrylic acid, and esters of such acids including methyl, ethyl, propyl, butyl, 2-ethylhexyl and cyclohexyl esters; acrylamide and methyacrylamide may be used, as well as vinyl acetate, styrene (also substituted styrenes), maleic acid anhydride, acrylonitrile, and the like. Such monomers usually comprise 5-75% (preferably 30-70%) by weight of the graft copolymer.

It will be understood that in practice the product of the graft copolymerization process is actually a mixture of true graft of resin on rubber along with a certain amount of separate, ungrafted resin (that is, the grafting efficiency is not 100%; see U.S. Pat. No. 4,202,948, Peascoe.)

In preparing the graft copolymer either saturated EPM (ethylene-propylene copolymer) or unsaturated EPDM (ethylene-propylene-non-conjugated diene [e.g., ethylidene norbornene, dicyclopentadiene, hexadiene]terpolymer) may be used.

The proportion of the three polymeric ingredients may vary, as indicated in the following table, wherein the amounts are expressed in parts by weight per 100 parts of blend:

|  | Parts by Weight | | |
| --- | --- | --- | --- |
|  | Broad | Preferred | More Preferred |
| (a) Polyester resin | 20-90 | 20-80 | 40-60 |
| (b) Polycarbonate resin | 5-60 | 15-50 | 20-40 |
| (c) Graft copolymer | 5-50 | 15-40 | 20-30 |

Preferred compositions tend to include a major proportion of the polyester resin component (a) which combines good moldability and good properties at elevated temperature, along with sufficient polycarbonate resin (b) and graft copolymer (c) to provide high notched impact strength.

Although it is possible to use modifier (c) levels above 30% such an increase would tend to decrease hardness, tensile strength and stiffness.

There is no specific upper limit for the level of polycarbonate (b). Blends containing 40% (or more) of (b) are capable of providing satisfactory results.

To prepare the blends of the invention, the polyester resin component (a), the polycarbonate resin component (b), and the graft copolymer composition (c) are mixed together at elevated temperature in conventional plastics mixing equipment, such as a twin screw extruder-mixer. If desired, any two of the components may be mixed together first, followed by mixing in of the third component.

One desirable mixing procedure is a two-step compounding process involving first working the graft copolymer composition (c) without the other ingredients (a) and (b), under shearing and fluxing conditions, for example in a twin screw extruder-mixer. This disperses the EPDM within the resin contained in the graft copolymer composition, to form an "inverted" composition in which the EPDM rubber is the discontinuous phase. The second step involves fluxing the inverted graft component (c) with the polyester component (a) and the polycarbonate component (b) under lower shear conditions, for example in a single screw extruder. In commercial practice these two steps can be combined in one extrusion operation, using an extruder having a first and second feedport; a section of the extruder downstream of the first feedport can be used to shear (invert) the graft copolymer (c) and a section downstream of the second feedport can be used to mix the graft with the other ingredients (a) and (b).

The inverted graft composition (a) may also be pelletized and tumble blended with polyester (a) and polycarbonate (b) pellets to form a physical mixture which can be fed into an injection molding machine or an extruder. In this case the plasticizing screw of the injection or extrusion machine can perform the second stage of mixing during fabrication.

As indicated, in one aspect the invention is based on the discovery that three-component blends of polybutylene terephthalate resin (PBT) with polycarbonate resin and EPDM grafted with at least one polar monomer have high impact strength.

Particularly desirable products are those in which the grafting monomers are styrene/acrylonitrile, styrene/methyl methacrylate, and methyl methacrylate. The presence of polycarbonate resin is required for high notched Izod impact strength.

The following example will serve to illustrate the practice of the invention in more detail.

EXAMPLE

Three graft copolymers, designated A, B and C in Table 1 below, are prepared by the slurry technique described in U.S. Pat. No. 4,202,948 (Peascoe) using an ethylene-propylene-ethylidene norbornene EPDM terpolymer rubber (E/P ratio 60/40; Mooney viscosity 68 ML-4 at 257° F., iodine number 20) as the spine rubber. The resin forming monomers in each graft are indicated in Table 1, which gives the composition of the resin portion of the graft copolymers. The overall resin-/EPDM ratio in the graft copolymer is 50/50 in each case.

TABLE 1

| Resin | | Ratio |
|---|---|---|
| A | styrene/acrylonitrile | 72/28 |
| B | styrene/methyl methacrylate | 50/50 |
| C | methyl methacrylate | 100 |

The blends listed in Table 2 are prepared by first fluxing the graft copolymers (A, B or C) in a 53 mm Werner and Pfleiderer twin-screw extruder equipped with a strand die and pelletizer. The pelletized grafts are then fluxed with PBT (VALOX 310; trademark) and polycarbonate resin (reaction product of bis-phenol A with phosgene; LEXAN 103 [trademark]) in a one inch single-screw extruder to make the blend shown in Table 2. Specimens for mechanical property testing are cut from ⅛ inch injection molded plaques.

Blends 5, 8–11, 13, and 15–19 in Table 2 illustrate the practice of the invention although blends 9–11 indicate that the optimum levels for polycarbonate resin and for the graft copolymer are each over 10% by weight. The other materials in Table 2 are controls prepared from unmodified PBT (1) or two-component PBT blends containing polycarbonate (2 and 14) or the graft copolymer (3, 4, 6, 7 and 12). In Table 2 the amounts of each component are expressed in parts by weight; PBT stands for polybutylene terephthalate resin, PC stands for polycarbonate resin, NIRT stands for notched Izod impact strength at room temperature (reported in foot pounds per inch of notch) and NI-20° F. stands for notched Izod impact strength at −20° F.; Rockwell R indicates the hardness.

TABLE 2

| Blend # | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Graft Type | | | A | A | A | B | B | B | B | B | B | C | C | | A | B | A | A | B |
| Graft Level | | | 10 | 20 | 20 | 10 | 20 | 20 | 20 | 10 | 10 | 20 | 20 | | 20 | 20 | 20 | 30 | 30 |
| PBT | 100 | 80 | 90 | 80 | 60 | 90 | 80 | 60 | 70 | 70 | 80 | 80 | 60 | 50 | 40 | 40 | 20 | 50 | 50 |
| PC | | 20 | | | 20 | | | 20 | 10 | 20 | 10 | | 20 | 50 | 40 | 40 | 60 | 20 | 20 |
| NIRT | 0.6 | 0.9 | 1.3 | 1.9 | 17.9 | 0.9 | 0.9 | 17.8 | 4.7 | 2.6 | 1.6 | 1.0 | 15.0 | 0.9 | 16.2 | 16.4 | 16.4 | 19.0 | 19.2 |
| NI −20° F. | 0.4 | 0.7 | 0.7 | 0.8 | 1.5 | 0.6 | 0.7 | 1.8 | 0.5 | 0.8 | 0.5 | 0.7 | 1.6 | 0.8 | 3.6 | 3.0 | 7.1 | 1.9 | 1.9 |
| Rockwell R | 119 | 120 | 113 | 108 | 107 | 114 | 107 | 108 | 108 | 114 | 115 | 108 | 114 | 118 | 106 | 108 | 113 | 102 | 101 |

The foregoing examples may be repeated using other aromatic polycarbonate resins or other EPM or EPDM graft copolymers as described in the patents mentioned above.

What is claimed is:

1. A blend of
    (a) poly(1,4-butylene terephthalate) resin,
    (b) polycarbonate resin, and
    (c) graft copolymer of at least one monomer on an ethylene-propylene-non-conjugated diene rubber spine, the proportions of (a), (b) and (c) expressed in parts by weight per 100 parts of (a), (b) and (c) being as follows:
    (a) 20–90
    (b) 5–60
    (c) 5–50,
    the said monomer being selected from styrene/acrylonitrile, styrene/methyl methacrylate or methyl methacrylate, in an amount of about 5–75% by weight of the graft copolymer (c), the said graft (c) being an inverted composition in which the rubber is a discontinuous phase.

2. A blend of
    (a) poly(1,4-butylene terephthalate) resin,
    (b) polycarbonate resin, and
    (c) graft copolymer of at least one monomer on an ethylene-propylene-non-conjugated diene rubber spine, the proportions of (a), (b) and (c) expressed in parts by weight per 100 parts of (a), (b) and (c) being as follows:
    (a) 20–90
    (b) 5–60
    (c) 5–50,
    the said monomer being selected from styrene/acrylonitrile, styrene/methyl methacrylate or methyl methacrylate, in an amount of 30–70% by weight of the graft copolymer (c), and the graft copolymer (c) having been worked under shearing and fluxing conditions to disperse the rubber portion of the graft within the resinous portion thereof thus forming an inverted composition in which the rubber portion is in the discontinuous phase prior to blending with (a) and (b).

3. A blend as in claim 2 in which the proportions of (a), (b) and (c) are as follows:
    (a) 20–80
    (b) 15–50
    (c) 15–40.

4. A blend as in claim 3 in which the proportions of (a), (b) and (c) are as follows:
    (a) 40–60
    (b) 20–40
    (c) 20–30.

5. A blend as in claim 4 in which the non-conjugated diene is ethylidene norbornene.

6. A blend as in claim 5 in which the grafting monomer is styrene/acrylonitrile.

7. A blend as in claim 5 in which the grafting monomer is styrene/methyl methacrylate.

8. A blend as in claim 5 in which the grafting monomer is methyl methacrylate.

9. A method of making a blend of
    (a) poly(1,4-butylene terephthalate) resin,
    (b) polycarbonate resin, and
    (c) graft copolymer of at least one monomer on an ethylene-propylene-non-conjugated diene rubber spine, the proportions of (a), (b) and (c) being as follows:
(a) 20–90
(b) 5–60
(c) 5–50,
the said monomer being selected from styrene/acrylonitrile, styrene/methyl methacrylate or methyl methacrylate, in an amount of about 30–70% by weight of the graft copolymer (c), comprising working the said graft copolymer (c) under shearing and fluxing conditions to disperse the rubber portion of the graft within the resinous portion thereof, thus forming an inverted composition in which the rubber portion is in the discontinuous phase, and thereafter blending the resulting inverted graft with components (a) and (b).

* * * * *